United States Patent [19]

Shenoi et al.

[11] Patent Number: 5,151,901
[45] Date of Patent: Sep. 29, 1992

[54] DS1 TRUNK PACKING AND UNPACKING APPARATUS AND METHOD

[75] Inventors: Kishan Shenoi, Milpitas; Patrick L. Hanagan; Helena S. Ho, both of San Jose; Frank I. Yu, Saratoga, all of Calif.

[73] Assignee: DSC Communications Corporation, Plano, Tex.

[21] Appl. No.: 506,691

[22] Filed: Apr. 9, 1990

[51] Int. Cl.⁵ .............................................. H04J 3/02
[52] U.S. Cl. .................................. 370/110.1; 370/112
[58] Field of Search ................. 370/56, 109, 112, 118, 370/55, 110.1; 375/30

[56] References Cited

U.S. PATENT DOCUMENTS 4,206,447 6/1980 Ching et al. .
4,513,426 4/1985 Jayant .
4,516,241 5/1985 Farah et al. .
4,519,073 5/1985 Bertocci et al. .
4,581,737 4/1986 Sparrell .
5,065,395 11/1991 Shenoi et al. ......................... 370/118

Primary Examiner—Benedict V. Safourek
Assistant Examiner—Melvin Marcelo

[57] ABSTRACT

Apparatus for packing and unpacking DS1 trunks comprises a packing circuitry for receiving compressed data from a plurality of DS1 trunks, packing the compressed data into the space of one DS1 trunk, and providing a serial output of data for the packed DS1 trunk. An unpacking circuitry is further provided for receiving data from a packed DS1 trunk, unpacking the data into the space of a plurality of DS1 trunks, and providing an output thereof.

22 Claims, 5 Drawing Sheets

FIG. 7
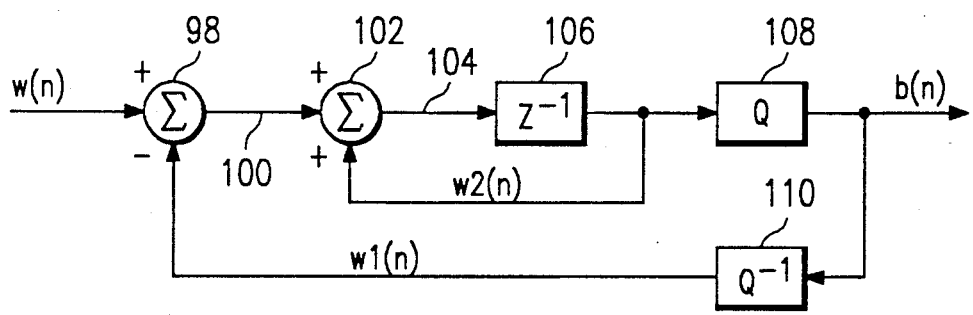
FIG. 8
| w2(n)(dBrN0) | b(n) | wl(n)(dBrN0) |
|---|---|---|
| [0, 23) | 001 | 20 |
| [23, 27) | 010 | 25 |
| [27, 31) | 011 | 29 |
| [31, 35) | 100 | 33 |
| [35, 39) | 101 | 37 |
| [39, 43) | 110 | 41 |
| [43, T) | 111 | 45 |
FIG. 9
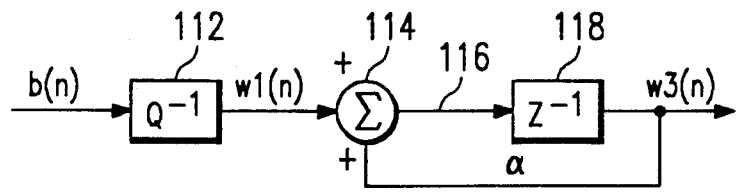

DS1 TRUNK PACKING AND UNPACKING APPARATUS AND METHOD

This application is related to Ser. No. 07/506,678, filed Apr. 9, 1990, titled "Rudimentary Digital Speech Interpolation Apparatus and Method" now U.S. Pat. No. 5,065,395; and Ser. No. 07/506,452, filed Apr. 9, 1990, titled "Bit Compression Apparatus and Method".

TECHNICAL FIELD OF THE INVENTION

This invention relates generally to the field of telecommunications, and more particularly to DS1 trunk packing and unpacking apparatus and method for performing the same.

BACKGROUND OF THE INVENTION

DS1has become an industry standard for telecommunication data format. In standard DS1, voice signals are digitalized at 64 kilobits per second (Kb/s), and 24 such 64 Kb/s streams are multiplexed into a 1.544 megabits per second (Mb/s) DS1 signal and transmitted over a T1 trunk. Often a 56 Kb/s or 64 Kb/s digital data signal is substituted for a digitalized voice signal. A waveform encoding technique, commonly referred to as ADPCM (adaptive differential pulse code modulation), compresses voice data to 32 Kb/s and allows a T1 trunk to carry up to 48 voice channels. However, because certain digital data signals of 56 Kb/s or 64 Kb/s are not compressible, the effective compression ratio over standard DS1 is less than 2:1. Standard ADPCM also cannot support voice-band-modem calls where the baud rate is 9.6 Kb/s or higher.

Recently, other waveform encoding techniques have been developed that encode voice data in 16 Kb/s or 24 Kb/s. In using these techniques, greater than 2:1 compression ratio is achieved, but at the cost of poorer data quality.

Another type of data compression technique is digital speech interpolation or DSI. The underlying idea of DSI is to use characteristics of human conversation. In a typical telephone conversation between two parties or more, usually only one party is talking at any one time. In other words, the transmission may be unidirectional most of the time. Additionally, human speech pattern usually includes periods of silence, where transmission is not required. Accordingly, DSI enables a reduction of transmission data by utilizing the statistical nature of human speech and conversation.

It is desirable to compress data at a ratio of greater than 2:1 without compromising the quality of data. It is further desirable to carry modem communication data signals of 56 Kb/s and 64 Kb/s. This is accomplished in the present invention by combining waveform encoding technology with DSI, in which data is packed into packets for transmission.

Accordingly, the present invention provides for packing compressed data from four DS1 trunks into the space of one DS1 trunk. The present invention further provides for unpacking the data in a packed DS1 trunk into four DS1 trunks. Moreover, the present invention is directed to overcoming one or more of the problems as set forth above.

SUMMARY OF THE INVENTION

In accordance with the present invention, T1 trunk packing and unpacking apparatus and method are provided which substantially eliminates or reduces disadvantages and problems associated with prior data compression and encoding schemes.

In an aspect of the present invention, apparatus for packing and unpacking DS1 trunks comprises a packing circuitry for receiving compressed data from a plurality of DS1 trunks, packing the compressed data into the space of one DS1 trunk, and providing a serial output of data for the packed DS1 trunk. An unpacking circuitry is further provided for receiving data from a packed DS1 trunk, unpacking the data into the space of a plurality of DS1 trunks, and providing an output thereof.

An important technical advantage of the present invention provides an advantageous apparatus for packing and unpacking DS1 data. Another important technical advantage of the present invention packs and unpacks DS1 data while maintaining industry framing formats, such as SF (super frame) and ESF (extended super frame).

BRIEF DESCRIPTION OF THE DRAWINGS

For a better understanding of the present invention, references may be made to the accompanying drawings, in which:

FIG. 7 is a block diagram of a delta-sigma-modulation technique applied to background noise representation;

FIG. 8 is a table associated with background noise representation;

FIG. 9 is a block diagram of a smoothing technique applied to reconstruct background noise;

DETAILED DESCRIPTION OF THE INVENTION

Figure 1:
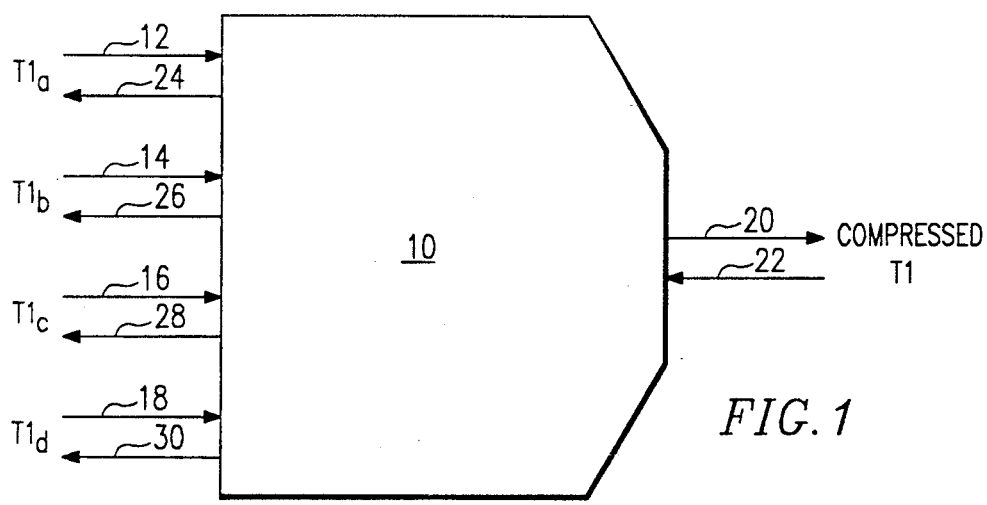
FIG. 1 is a simplified top level block diagram of a data compression system.

Referring to FIG. 1, a high level block diagram providing an overview of a data compression system 10 is shown. Data compression system 10 receives four standard DS1 trunks $T1_a$, $T1_b$, $T1_c$ and $T1_d$, numbered 12-18, respectively. DS1 trunks $T1_a$, $T1_b$, $T1_c$ and $T1_d$ each carry 24 channels of telecommunications and are commonly called the "drop" side in telecommunication terminology. The data of trunks $T1_a$-$T1_d$ are compressed, and provided as outputs onto a single 1.544 Mb/s DS1 trunk 20 for transmission, which is commonly called the "line" side. The data compression in system 10 is achieved by utilizing a combination of waveform encoding and a variation of DSI (digital signal interpolation). Waveform encoding is performed selectively on channels that carry voice data, which are compressed to 40, 32, 24, or 16 Kilobits per second (Kb/s) depending on bandwidth availability.

Similarly, data compression system 10 also receives compressed data over a 1.544 Mb/S DS1 trunk 22, decompresses the data, and outputs the data over four 24channel standard DS1 trunks on lines 24-30. It is important to note that data carried on compressed DS1 trunk conforms to standard industry framing formats such as SF (super-frame) and ESF (extended-super-frame).

Figure 2:
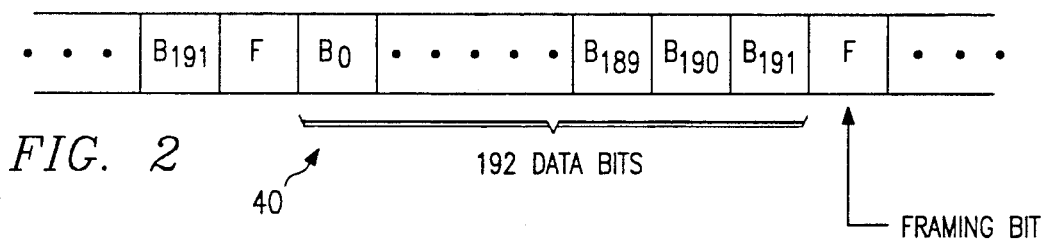
FIG. 2 is an illustration of the DS1 data format.

Referring to FIG. 2, a standard DS1 data stream 40 is shown. The data stream consists of 193 bits per frame transmitted every 125 microseconds ($\mu$s) or 1.544 Megabits per second (Mb/s). Of the 193 bits, the first 192 bits are data bits B0, B1, . . . , B191, which carry information. In conventional DS1, the 192 data bits B0, B1, . . . , B191 are further divided into 24 eight-bit words, each associated with one of 24 channels. The last bit, F, or the 193rd bit, is an overhead bit used for framing, for example, and follows a preassigned pattern.

Figure 3:
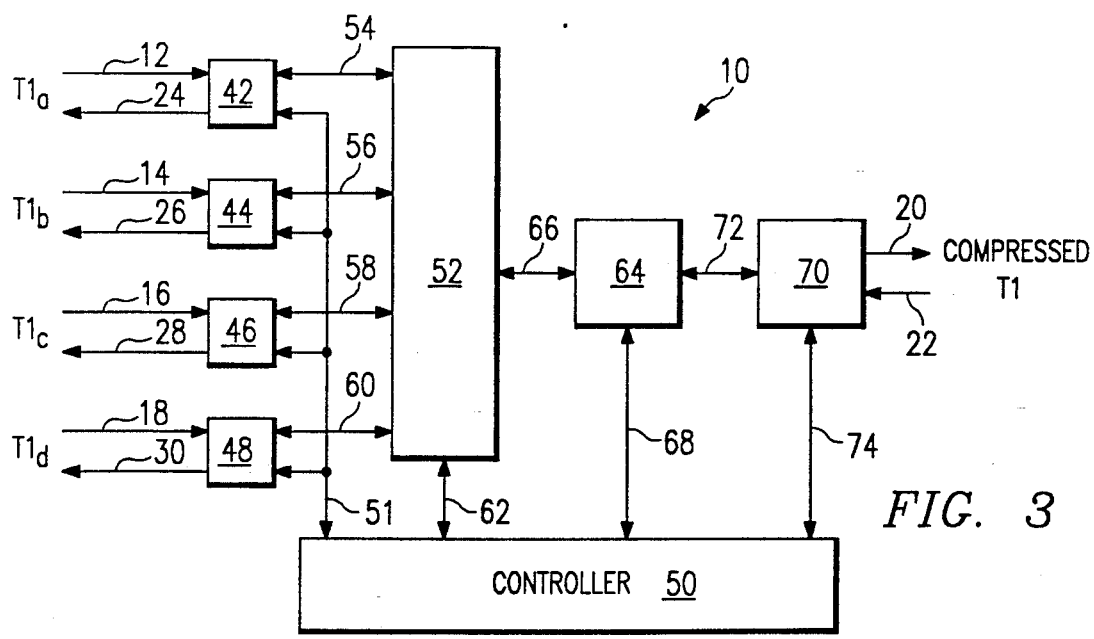
FIG. 3 is a simplified functional block diagram of the data compression system.

A functional block diagram of data compression system 10 is shown in FIG. 3, where like numerals refer to like elements in FIG. 1. DS1 interface circuitry 42-48 receives and transmits standard DS1 data over T1$_{a-d}$. In receiving data over lines 12-18, DS1 interface circuitry 42-48 identifies the F bit in the received data streams and extracts it. In addition, DS1 interface circuitry 42-48 determines whether data on a certain channel is compressible, whether a channel is silent, and the level of background noise. The information derived from such determination is passed on to a controller 50 over bus 51. The interface circuitry 42-48 further demultiplexes the 24 channels per trunk into 96 constituent channels and passes the data to digital signal processing (DSP) circuitry 52 over lines 54-60.

DSP circuitry 52 is instructed by controller 50, via line 62, to encode the signals on each of the 96 channels into one of 16, 24, 32, 40, or 64 Kb/s by known waveform encoding techniques such as ADPCM. In encoding from 64 Kb/s to 16 Kb/s, only two bits are used to encode an eight bit word; to 24 Kb/s, only three bits; to 32 Kb/s, four bits; to 40 Kb/s, five bits; and to 64 Kb/s, no encoding is performed. DSP circuitry 52 may be implemented with DSP integrated circuits, such as the chip-set available from BASE2 Inc. which includes UGA-001-2, UGA-003-2, UGA-004-2, the parallel processor, serial processor and address generator, respectively.

The compressed or encoded 96 channels of data from DSP circuitry 52 are passed to a packing portion of a packing and unpacking circuitry 64 via line 66. The Packing portion of circuitry 64, as the name implies, packs the 96 channels of encoded data into a single 1.544 Mb/s DS1 trunk 20 for transmission. Packing and unpacking circuitry 64 receives control signals on line 68 from controller 50, which will be discussed in detail below.

A compressed DS1 interface circuitry 70 receives compressed and packed data on line 72 from packing and unpacking circuitry 64 for transmission on compressed DS1 trunk line 20. The data from packing and unpacking circuitry 64 are reformatted to conform to standard DS1 framing formats. In particular, a framing bit is inserted for every 192 bits. Embedded in the compressed DS1 format are control parameters, such as the number of bits per sample for each channel, to enable the receiving data compression system 10 to unpack and decode the data transmitted on compressed T1 trunk.

As the receiving device, data compression system 10 receives 96 channels of compressed data over transmission line 22. The framing bit, F, is extracted from the bit stream. Additionally, data bits are separated from the control parameter bits, in which the 96 channels of compressed data is passed to an unpacking portion of circuitry 64 on line or lines 72, and the control parameters are passed to controller 50 on line or lines 74.

The unpacking portion of circuitry 64 unpacks the 24 channels of compressed data received from compressed DS1 interface circuitry into 96 channels. The unpacked data are then made available to DSP circuitry 52 where the compressed data are decoded back into full eight-bit samples. The control parameters necessary for unpacking and decoding are provided by controller 50 over lines 68 and 62, respectively. Once the data are decoded, they are passed to DS1 interface circuitry 42-48. DS1 interface circuitry perform noise-matching tasks for each channel and further multiplexes the 96 channels into four trunks of 24 channels. The 24 channels are then transmitted to the "drop" side to a caller, a modem, a facsimile machine or the like.

In order to compress data by waveform encoding and DSI in the present invention, three key parameters of the data signals being transmitted are determined. These key parameters are: Is the data in a channel compressible? Is the channel silent? What is the background noise level?

Figure 4:
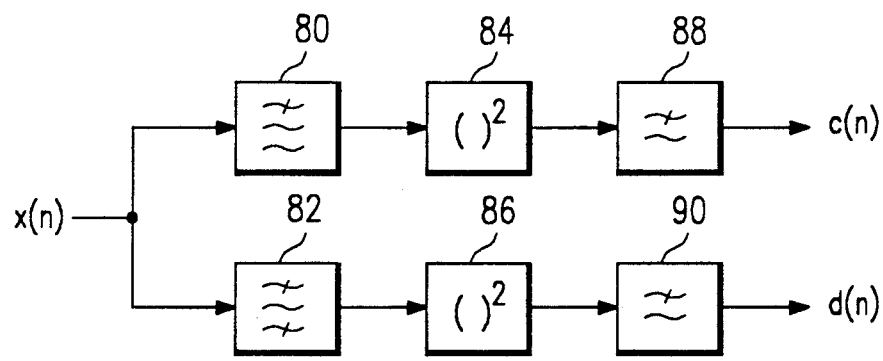
FIG. 4 is a filtering scheme to determine the compressibility of the data in a channel.

Referring to FIG. 4, the compressibility of data in a channel is determined. The determination involves the recognition of speech signals, modem signals and pure digital signals, such as switched-56 and switched-64 traffic. In general, speech signals are compressible, but modem, switched-56 and -64 signals are not compressible. Switched-56 and -64 traffic is determined by detecting preambles and/or end-of-call codes and/or frequencies. Such determination techniques are known and have been implemented.

To distinguish the speech signals from the voice-band modem signals, a dual filtering scheme is used as shown in FIG. 4. A data signal x(n) for a channel at time n is passed to both a low band bandpass filter 80 and a high band bandpass filter 82 in parallel. The low band bandpass filter 80 preferably passes signals in the 0.3 kHz to 0.7 kHz range, and the high band bandpass filter 82 preferably passes signals in the 1.1 kHz to 2.8 kHz range. The resultant sequences from respective filters 80 and 82 are subsequently squared in blocks 84 and 86, respectively. The squared sequences from blocks 84 and 86 are then filtered again in lowpass filter blocks 88 and 90, respectively, to generate a low band power signal c(n) and a high band power signal d(n).

In operation, the dual filter scheme distinguishes the speech signals from the voice-band modem signals by determining the signal power frequencies. Typically, the power of voice-band modem signals are concentrated mostly in the frequency band above 1 kHz and the power of speech signals are concentrated mostly in the frequency band below 900 Hz. Therefore, by comparing the relative strengths of low band power c(n) and high band power d(n) of a signal x(n), a determination may be made as to the nature of the signal present in the channel. If a channel is found to be currently carrying speech signals, the speech signals may be compressed using waveform encoding techniques. The encoded speech signal may be encoded in 40, 32, 24, or 16 kb/s, depending on the traffic condition on all 96 channels. The speech signals are encoded into the maximum number of bits per sample that can be supported by the system to achieve the best sound quality possible under the current conditions.

Figure 5:
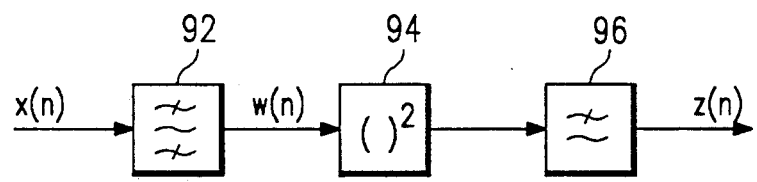
FIG. 5 is a filtering scheme to determine the presence of silence in a channel.

In order to perform DSI, channel silence determination is necessary. Referring to FIG. 5, a filtering scheme to determine whether the signal on a channel is silent is shown. The data signal sequence x(n) for a channel is first filtered through a bandpass filter, as shown represented by symbol 92. Preferably, filter 92 is used to eliminate d.c. (direct current) and 4 KHz components, which are spurious signals introduced by peripheral devices. The filtered signal, represented by w(n), is then squared, as shown in block 94, and passed through a narrow lowpass filter 96. The resultant filtered sequence, z(n), is a measure of the short-term power of the data sequence x(n). The sequence z(n) may also be expressed by the following convolution sum equations:

$$z(n) = \sum_{k=0}^{M-1} h(n - k) [w(k)]^2 \quad (1)$$

$$z(n) = \sum_{k=0}^{\infty} h(n - k) [w(k)]^2, \quad (2)$$

where Equation (1) represents Finite Impulse Response filters, and Equation (2) represents Infinite Impulse Response filters.

Figure 6:
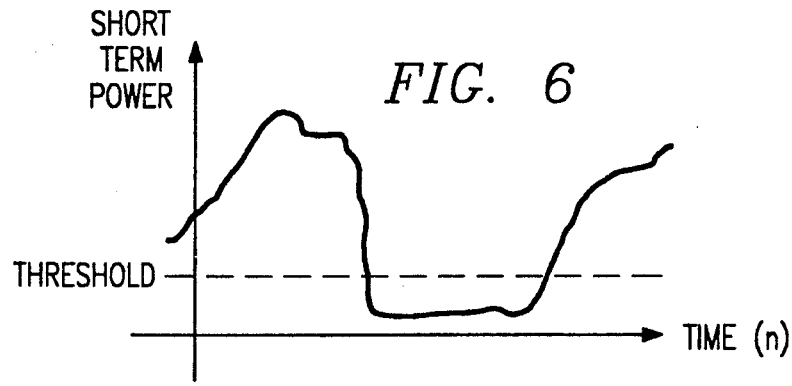
FIG. 6 is a short term power v. time graph with a threshold for silence determination.

In FIG. 6, the filtered signal z(n) is plotted on a graph with a predetermined threshold level of approximately −45dBm0. The threshold level establishes the division line between speech signals and background noise signals. If z(n) for any time n of a channel is above the threshold level, then the signal x(n) for that channel is transmitted, otherwise, the channel contains only background noise and is determined to be silent.

In the preferred embodiment of the present invention, the threshold level varies proportionately with the background noise level. The threshold level is established to be D above the background noise level, where D is approximately 3dB.

Those channels in which the short-term power z(n) is consistently below the threshold level is deemed "potentially silent." However, special considerations are required to ensure that clipping of utterances does not occur, and that occasional short silent periods in a typical speech pattern are not deleted. A channel is therefore designated as "silent" if and only if it has been designated as "potentially silent" and the same channel for j msec prior was also "potentially silent." "j" is a predetermined parameter and is approximately 100 msec in duration. It is important to note that although a channel may be deemed "potentially silent," it is treated like any other channels that do carry speech signals, until it is deemed "silent."

If a channel is deemed to be "silent," no speech signal is transmitted for that channel. However, in order for the channel to sound "live" and not disconnected, the background noise is maintained on the receiver side. Thus, the background noise power is determined and transmitted.

Referring to FIG. 7, the background noise level may be quantized as shown in the block diagram. The sequence w(n), which was the bandpass filtered x(n) shown in FIG. 5, is summed with a sequence −w1(n), as shown by the summation symbol 98. The resultant sequence carried on line 100 is then summed with a sequence w2(n), shown by the summation symbol 102. The resultant summed sequence on line 104 is then passed to a unit delay block 106 and a sequence w2(n) is derived therefrom. Sequence w2(n) is subsequently passed to a quantizer 108, which quantizes sequence w2(n) and generates b(n), a three-bit representation of the background noise power for time n. b(n) is fed back to an inverse quantizer 110, which produces the sequence w1(n). Constructed in this manner, the background noise level may be economically transmitted to the receiving end in the space of only three bits.

The block diagram shown in FIG. 7 illustrates a quantization technique known as delta-sigma modulation. Preferred values for w1(n), w2(n) and b(n) are shown in a table in FIG. 8. Sequences w1(n) and w2(n) for time n are in unit dBrN0 and b(n) is the resultant three-bit binary representation of the background noise power. The symbol T in the table represents the threshold level. The three-bit representation for b(n) for each channel is transmitted as part of the control parameter to be discussed below.

FIG. 9 shows how the background noise may be reconstructed at the receiver end from the three-bit binary representation of background noise power b(n). b(n) is processed by a first order digital filter illustrated in block diagram form. Sequence b(n) is passed to an inverse quantizer 112 to generate a sequence w1(n). Sequence w1(n) is summed with a sequence $\alpha w3(n-1)$, represented by summation symbol 114. The summed signal on line 116 is passed to a unit delay block 118 to generate the w3(n) sequence. Sequence w3(n) is then fed back to be summed with w1(n) through a multiplier $\alpha$. Thus, at the receiving end, the background noise power w3(n) is reconstructed from the three-bit binary representation b(n), which gives the telephone connection a "live" feel. The filtering described above is a smoothing technique that is known in the art of digital signal processing.

In the preferred embodiment of the present invention, the filtering schemes described above, which determine data compressibility, silence, and background noise level, are performed by the DS1 interface circuitry 42-48, as shown in FIG. 3. The finding of such determinations are relayed to controller 50 to be used in the waveform encoding and DSI processes.

The DSI technique employed in the present invention may be called Rudimentary Digital Speech Interpolation or RDSI. In RDSI, encoded data bits and control parameter bits are grouped into units of frames and multi-frames. Referring to both FIGS. 10 and 11, the format of a compressed data frame 120, and the format of a multi-frame 122 are respectively shown. A frame 120 consists of 182 data bits D0, D1, ..., D181, and ten control bits C0, C1, ..., C9. A multi-frame 122 is composed of 96 such frames. Each frame 120 may carry data for 96 channels, each channel occupies N bits/sample, where N may vary from two to eight or be zero if the channel is deemed "silent". This bit assignment is valid for the entire multiframe 122.

The control bits in a multi-frame are control parameters for the next multi-frame. In the ten control bits for a frame, for example frame number five in a multi-frame, three bits are devoted to the representation of background noise power, b(n), for channel five as described above. Two bits are allocated for conventional telecommunication A/B signaling bits associated with channel five, and three other bits specify the number of encoded bits per sample for channel five of the next multi-frame. The rest of the ten control bits (two bits) may contain a predetermined framing pattern to demarcate each frame or a group of frames, such as frames number one through ten. If necessary, the two control bits may also be used to transport system status information such as alarms. Note that system 10 may be implemented so that control bits C0 to C9 is the first ten or the last ten bits in the 192-bit frame.

Constructed in this manner, each DS1 frame may be identified by a modulo-96 scheme. Note that each multi-frame 122 is transmitted in 12 milliseconds (msec), since the standard DS1 transmission rate is 192 information bits every 125 micro s. In addition, note that framing bits F are not included in the multi-frame as they have been deleted by DS1 interface circuitry 42-48.

In operation, RDSI puts encoded data for channels one through 96 into each frame. The encoded data for each non-silent channel may be two bits, three bits, four bits, five bits, or eight bits (no compression). For those channels that are silent or inactive, no data bits are transmitted. The number of bits per sample for each channel does not change within the boundaries of a multi-frame. Thus, if a channel is deemed "silent," it is so for the whole multi-frame. Similarly, if data in a channel is encoded in three bits per sample, it remains so for the duration of the multi-frame. However, the channel that was encoded in three bits in the last multi-frame may now be encoded in five bits, and a channel that was silent in the previous multi-frame now may carry speech signals. Thus, the bandwidth for each channel is dynamically allocated each multi-frame, depending on the signal type, activity, silence, and traffic conditions.

It is evident that data compression system 10 compresses data at a ratio of greater than 2:1 by the use of waveform encoding and RDSI. Data which were eight bits per channel, or 768 bits for 96 channels, have been compressed into the space of 182 bits, realizing a compression ratio of approximately 4.22:1.

The control bits necessary to decode data in a channel are found in the frame of corresponding numerical order of the previous multi-frame. Implemented in this fashion, the unpacking portion of the packing and unpacking circuitry 64 and the decoding portion of the DSP circuitry 52 may be readied as soon as the arrival of a multi-frame. Note that in RDSI control parameters are transmitted every multi-frame regardless of status changes. This aspect differs greatly from conventional DSI where updates are transmitted only in the event of status changes. In DS1 error events such as an error burst or slip, the recovery time for conventional DSI is substantial because only updates are transmitted, so that the transmission error will propagate until the error is discovered and recovered. On the other hand, if a similar error occurs in the present data compression system, only data in the current multi-frame may be corrupted.

The 96-frame multi-frame compressed data format 122 is advantageous for several reasons. First, the SF DS1 format duration of 1.5 msec and the ESF DS1 format duration of 3 msec are integer sub-multiples of the 12 msec multi-frame duration. This allows a simplified generation and acquisition of multi-frame synchronization with the SF and ESF formats. Second, the number of frames in a multi-frame is optimal to keep the number of overhead bits to a minimum, and yet keeps the transmission time of the multi-frame small. Third, the overhead bits distributed evenly in the frames of a multi-frame minimizes the amount of storage required.

Figure 12:
FIG. 12 are a timing diagram of an internal bus in the data compression system.
Figure 12:
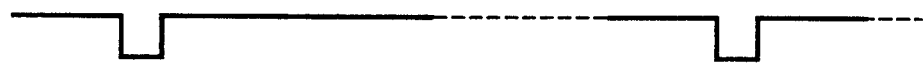
Figure 12:
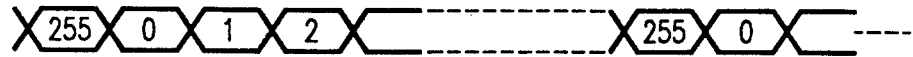

In the preferred embodiment of the present invention, standard DS1 data is serially received by DSP circuitry 52. The timing of system 10 internal buses 54-60, 66, 72 is shown in FIG. 12. A CLOCK signal running at 2.048 megahertz (MHz) and a FRAME SYNCH signal at 8 kilohertz (KHz) are used for timing and synchronization purposes. The CLOCK signal defines the boundary of bit-cells, and the FRAME SYNCH signal defines the boundary of each frame consisting of 256 bit-cells, of which the first 192 bit-cells contain DS1 data and control bits. Preferably, S-T BUS of MITEL Semiconductor conforming to the timing of FIG. 12 is used to implement system 10 internal buses.

Figure 13:
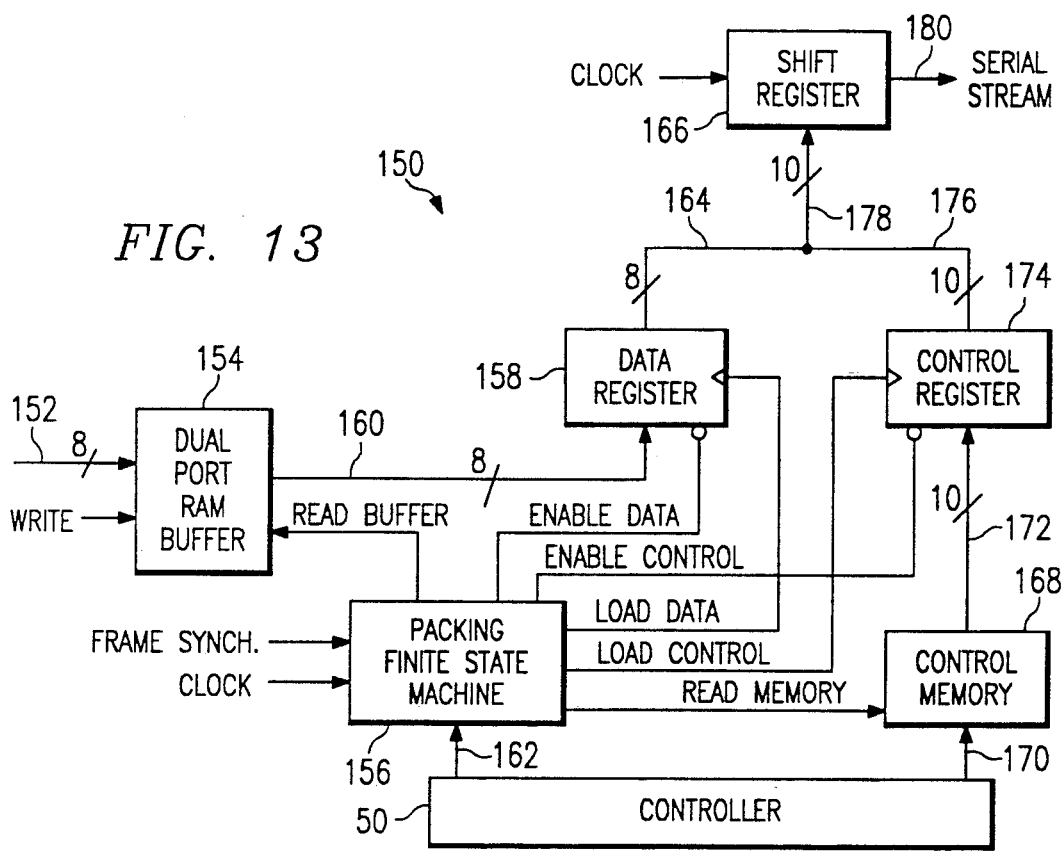
FIG. 13 is a functional block diagram of a packing portion of a packing and unpacking circuitry of the data compression system.

Referring to FIG. 13, a packing portion 150 of packing and unpacking circuitry 64 receives waveform encoded DS1 data over an 8-bit parallel bus 152, and stores the data in a buffer, such as a dual port RAM (random access memory) buffer 154. Dual port RAM buffer 154 is preferably implemented with a two page dual port RAM device, model number 7132 manufactured by IDT. A WRITE signal issued from DSP circuitry 52 is provided as a control signal to write data therefrom to dual port RAM buffer 154.

A packing finite state machine 156 issues a READ BUFFER signal to dual port RAM buffer 154 to load compressed data into an 8-bit data register 158 over a bus 160. Data register 158 is clocked by a LOAD DATA signal issued by packing finite state machine 156 to load the compressed data. Packing finite state machine 156 is capable of determining the beginning and the end of a frame by synchronizing with the CLOCK and FRAME SYNCH signals. Packing finite state machine 156 is also capable of determining how many bits per sample (N) are allocated for each of the 96 channels, as instructed with control signals received over line or lines 162 from controller 50. N bits of data, where N is less than or equal to eight, is loaded into data register 158. Data register 158 is enabled by an ENABLE DATA signal generated by packing finite state machine 156 to output the N-bit data onto bus 164 to the most significant bits of a shift register 166.

Packing finite state machine 156 also controls a control memory 168, which contains the ten overhead control bits per frame required for transmission. The overhead control bits C0, C1, ..., C9 are supplied to control memory 168 on line or lines 170 from controller 50. Packing finite state machine 156 issues a READ MEMORY signal to control memory 168 to instruct it to output a 10-bit control word over bus 172 to a 10-bit control register 174, which is clocked by a LOAD CONTROL signal generated by packing finite state machine 156. Control register 174 is also output enabled by a ENABLE CONTROL signal issued by packing finite state machine 156 to output the control bits onto bus 176. Buses 164 from data register 158 and bus 176 from control register 174 are coupled, preferably in a tri-state fashion and provided as a 10-bit input bus 178 to shift register 166. Shift register 166 is clocked by the 2.048 MHz S-T bus clock to right shift the bits received on bus 178 and generate a serial output on line 140. Packing finite state machine 156 preferably consists of digital logic circuits including counters, registers, latches, flip-flops, logic gates and the like, but may be alternatively implemented with a microprocessor.

Figure 10:
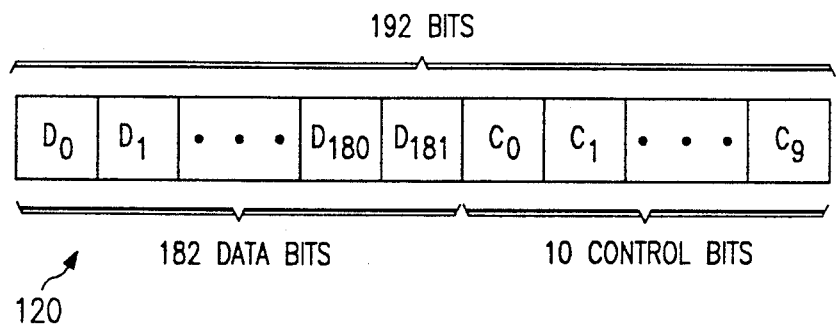
FIG. 10 is an illustration of a compressed DS1 frame format.
Figure 11:
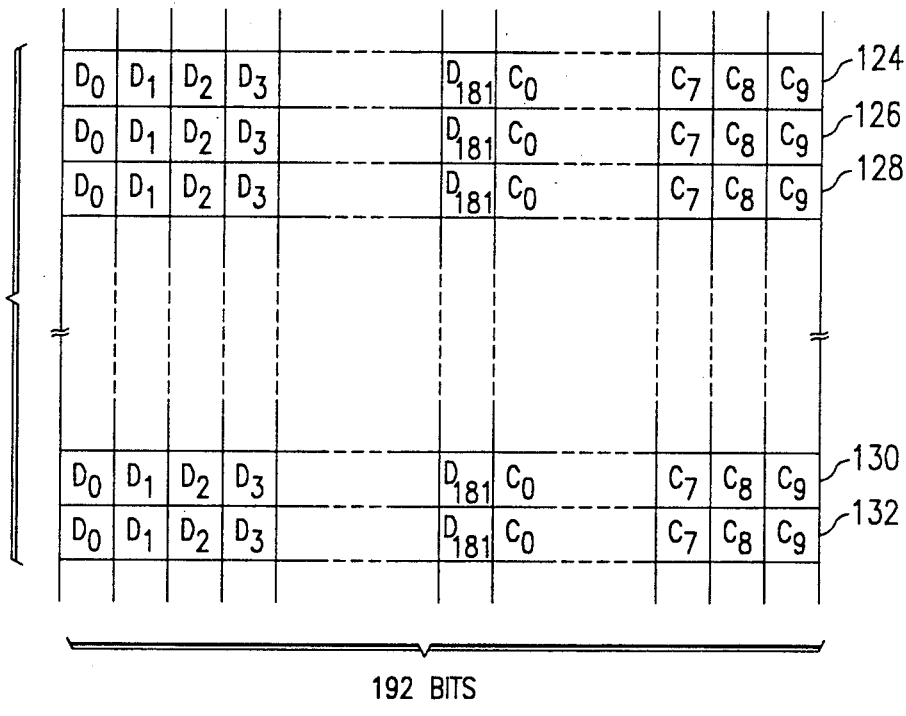
FIG. 11 is an illustration of a multi-frame consisting of 96 compressed DS1 frames.

In operation, packing portion 150 of packing and unpacking circuitry 64 receives compressed data in the format shown in FIGS. 10 and 11 on 96 channels, and packs the data into the space of 24 channels before transmitting the data on a transmission medium coupled to compressed DS1 interface circuitry 70. Controller 50 supplies waveform encoding control parameters, such as the number of bits per sample for each channel to control memory 168 and packing finite state machine 156. Packing finite state machine 156 uses this encoding parameter information to demarcate the boundaries of each encoded sample of data for each channel. Encoded data is supplied by DSP circuitry 52 and received by packing portion 150 on line 152 connected to dual port RAM buffer 154. Packing finite state machine 156 loads data register 158 with a sample of data by issuing a READ BUFFER signal to dual port RAM buffer 154 in addition to clocking data register 158 with the LOAD DATA signal. In this manner, encoded data, in N-bit groups, are loaded into data register 158 and then supplied to shift register 166, where it is converted into a serial stream and output on line 180 to compressed DS1 interface circuitry 70.

The ENABLE DATA signal is generated by packing finite state machine 156 at the beginning of bit cell B(k) for channel k, $$B(1)=0,$$

and $$B(k+1)=B(k)+N,$$

where k = 1, 2, 3 ..., 96, and N is the number of bits per sample for channel k.

For example, encoded data for channel 5 is currently being loaded into shift register 166. Channel 5 data is encoded in three bits and started on bit cell 10. Packing state machine 156 then must issue an ENABLE DATA signal at the beginning of bit cell B(6) = 10+3 = 13 to load the data for channel 6 into shift register 166.

Control memory 168 contains all the ten-bit per frame or 960-bit per multi-frame of control bits to be transmitted. Control register 174 loads control bits C0, C1, ..., C9 by being clocked by the LOAD CONTROL signal generated by packing finite state machine 156. Control register 174 is then enabled by the ENABLE CONTROL signal issued from packing finite state machine 156 at the beginning of bit cell 182 to load the ten bits of control bits into shift register 166.

Figure 14:
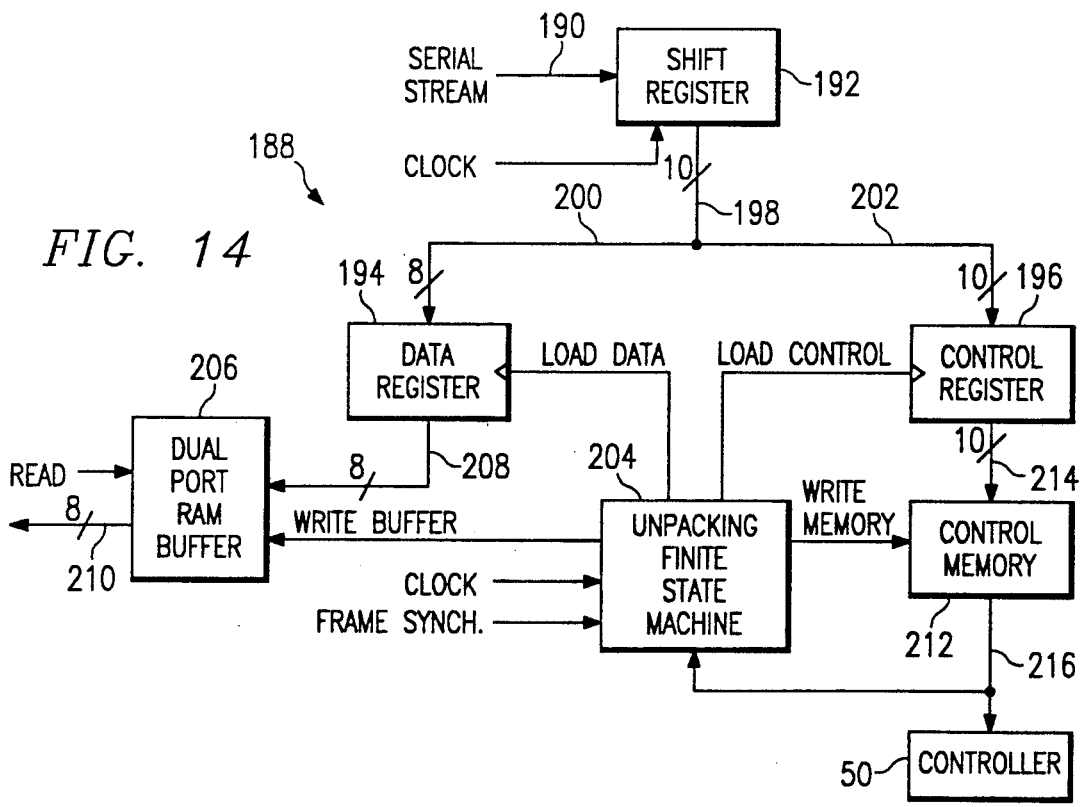
FIG. 14 is a functional block diagram of a unpacking portion of a packing and unpacking circuitry of the data compression system.

Referring to FIG. 14, an unpacking portion 188 of packing and unpacking circuitry 64 receives a DS1 serial stream from compressed DS1 interface circuitry 70 on line 190. The serial stream may contain a combination of data and control bits and is received by a shift register 192 clocked by the 2.048 MHz CLOCK signal. Shift register 192 right shifts the bits in the serial stream and provides the data to either a data register 194 or a control register 196 on a 10-bit bus 198. Bus 198 is connected to two buses 200 and 202 of eight bits and ten bits wide, respectively. 8-bit bus 200 transmits the N most significant bits of data in shift register 192 to data register 194, where N is less than or equal to eight, and is the number of bits per sample for each channel as determined by the waveform encoding process.

Data register 194 is clocked by a LOAD DATA signal generated by an unpacking finite state machine 204 to load the data present on bus 200. A dual port RAM buffer 206 is coupled to data register 204 by an 8-bit bus 208. A WRITE BUFFER signal generated by unpacking finite state machine 204 is used to instruct dual port RAM buffer 206 to store the N-bit data in data register 194. DSP circuitry 52 (FIG. 3) issues a READ signal to access the data stored in dual port RAM buffer 206 and receives the data carried on a bus 210. Unpacking finite state machine 204, like packing finite state machine 156, also receives the CLOCK and the FRAME SYNCH signal for synchronization. Additionally, it generates a LOAD CONTROL signal to clock control register 196 for loading the ten control bits stored in shift register 192 into control register 196. A control memory 212 is coupled to control register 196 via a 10-bit bus 214 and is enabled by a WRITE MEMORY signal generated by unpacking finite state machine 204 to store the control bits therein. Control memory 212 is coupled to controller 50 so that controller 50 may access the control bits over connection line or lines 216. The control bits stored in control memory 212 are also accessible to unpacking finite state machine 204. Unpacking finite state machine 204 preferably consists of digital logic circuits including counters, registers, latches, flip-flops, logic gates and the like, but may be alternatively implemented with a microprocessor.

Note that although the packing and unpacking portions 150 and 188 of packing and unpacking circuitry 64 described above contain components which are comparable, the packing and unpacking portions 150 and 188 function and operate independently. The components which have similar names and/or function similarly are separate entities and should not be misconstrued to be the same. The only common component in the two portions 150 and 188 is controller 50.

In operation, unpacking portion 188 of packing and unpacking circuitry 64 receives compressed data over 24 channels and unpacks it into the 96-frame multi-frame data format shown in FIGS. 10 and 11. In reference to FIG. 14, a serial stream is transmitted in the form of 256 bit-cells (FIG. 12) on line 190 to shift register 192. Unpacking finite state machine 204 issues the LOAD DATA or LOAD CONTROL signals at appropriate times to load data and control registers 194 and 196. Since both shift register 192 and unpacking finite state machine 204 are synchronized with the same CLOCK signal, this is easily accomplished. Assume for the discussion below that the control bits are the last ten bits of frame 90 as shown in FIG. 10. Unpacking finite state machine 204 issues the LOAD DATA signal at the end of bit cell B(k) for channel k, $$B(0)=0,$$

and $$B(k)=B(k-1)+N,$$

where k = 0, 1, 2, 3 ..., 96, and N is the number of bits per sample for channel k.

This may be illustrated by the following example. Assume data for channel 5 is currently being received in shift register 192. Channel 5 data is encoded in three bits and the previous channel, channel 4, ended on bit-cell number ten. Unpacking state machine 204 then must issue a LOAD DATA signal at the end of bit cell B(5) = 10+3 = 13 to load the data for channel 5 into data register 194.

The data bits, as they are being loaded into data register 194, are subsequently written into dual port RAM buffer 206 at the occurrence of the WRITE BUFFER signal. The data bits are stored therein for access by DSP circuitry 52, where they are decoded.

After all of the data bits have been loaded, the control bits C0, C1, ..., C9 are loaded into control register 196 at the end of bit cell 191 clocked by the LOAD CONTROL signal. The control bits of the current multi-frame contain bits per sample encoding information as well as other channel parameters of the next multi-frame 122. The control bits are subsequently stored into control memory 214, which is enabled by the WRITE MEMORY signal. After receiving a multi-frame, all the control bits for the next multi-frame are stored in control memory 214. Unpacking finite state machine 204 and controller 50 access the information stored therein so that the next multi-frame may be processed.

Although the present invention has been described in detail, it should be understood that various changes, substitutions and alterations can be made hereto without departing from the spirit and scope of the invention as defined by the appended claims.

What is claimed is:

1. Apparatus for packing compressed data from a plurality of telecommunication lines, comprising:
   a buffer for receiving and storing said compressed data from said plurality of telecommunication lines;
   a data register coupled to said buffer for reading said compressed data from said plurality of telecommunication lines stored in said buffer;
   a control memory for storing control parameters;
   a control register coupled to said control memory for reading said control memory and storing said control parameters; and
   a shift register coupled to both said data register and said control register for receiving one of said data and control parameters therefrom respectively and providing a serial output thereof.

2. The apparatus, as set forth in claim 1, wherein said data register reads samples of said buffered data for each channel in said telecommunication line, said shift register receiving said data for each channel and providing a serial output thereof, said data sample for each channel having a variable number of bits.

3. The apparatus, as set forth in claim 2, further comprising a finite state machine coupled to said buffer, control memory, data register and control register for generating a plurality of control signals for enabling access thereof, said infinite state machine receiving a clock signal and a synchronization signal that demarcates the data samples for each channel.

4. Apparatus for unpacking compressed data from a packed telecommunication line into data for a plurality of telecommunication lines, comprising:
   a shift register for receiving a serial input from said packed telecommunication line, said serial input including data and control parameters;
   a data register coupled to said shift register for receiving said data;
   a control register coupled to said shift register for receiving said control parameters;
   a buffer coupled to said data register for receiving said data from said data register and storing said data; and
   a control memory coupled to said control register for receiving control parameters from said control register and storing said control parameters.

5. The apparatus as set forth in claim 4, wherein said data register reads samples of data for each channel in said telecommunication line from said shift register, said buffer receiving and storing said data samples for each channel, said data samples for each channel having a variable number of bits.

6. The apparatus, as set forth in claim 5, further comprising a finite state machine coupled to said buffer, control memory, data register and control register for generating a plurality of control signals for enabling access thereof, said infinite state machine receiving a clock signal and a synchronization signal that demarcate the data samples for each channel.

7. Apparatus for packing a plurality of DS1 trunks into one DS1 trunk, comprising:
   a buffer for receiving and storing data from said plurality of DS1 trunks;
   a data register coupled to said buffer for reading said DS1 data stored in said buffer;
   a control memory for storing control parameters;
   a control register coupled to said control memory for reading said control memory and receiving said control parameters; and
   a shift register coupled to both said data register and said control register for receiving one of said DS1 data and control parameters and providing a serial output thereof.

8. The apparatus, as set forth in claim 7, wherein said data register reads samples of said buffered data for each channel in said DS1 trunks, said shift register receiving said data for each channel and providing a serial output thereof, said data sample for each channel having a variable number of bits.

9. The apparatus, as set forth in claim 8, further comprising a finite state machine coupled to said buffer, control memory, data register and control register for generating a plurality of control signals for enabling access thereof, said finite state machine receiving a clock signal and a synchronization signal for demarcating the data samples for each channel.

10. The apparatus, as set forth in claim 8, wherein said apparatus resides in a data compression system and said control parameters include the number of data bits per sample for each channel.

11. Apparatus for packing data in at least four DS1 trunks having 4 n channels into one DS1 trunk having n channels, comprising:
    a finite state machine for receiving a clock signal and a synchronization signal and for producing a plurality of control signals;
    a buffer for receiving said 4n-channel DS1 data, said buffer enabled by a first control signal produced by said finite state machine;
    a data register coupled to said buffer for reading said buffer and storing data associated with a channel, said data register clocked and enabled by second and third control signals produced by said finite state machine;
    a control memory for storing channel parameters, said control memory enabled by a fourth control signal produced by said finite state machine;
    a control register coupled to said control memory for reading said control memory and storing said channel parameters, said control register clocked and enabled by fifth and sixth control signals produced by said infinite state machine; and
    a shift register coupled to both said data register and said control register for receiving one of said data and channel parameters and providing a serial output thereof, said data register and control register output enabled by seventh and eighth control signal produced by said finite state machine.

12. The apparatus, as set forth in claim 11, wherein said data register reads samples of said buffered data for each channel in said DS1 trunks, said shift register receiving said data for each channel and providing a serial output thereof, said data sample for each channel having a variable number of bits, and said clock and said synchronization signals.

13. DS1 trunk data packing apparatus in a data compression system, said data compression system encoding data for a plurality of channels in a plurality of DS1 trunks, said apparatus comprising:
  buffering means for receiving and storing encoded data for each channel;
  first register means coupled to said buffering means for reading said encoded data for each channel;
  first control means enabling access to said buffering means by said first register means to read encoded data for each channel;
  memory means for receiving and storing control parameters associated with said data compression;
  second register means coupled to said memory means for reading said control parameters;
  second control means enabling access to said memory means by said second register means; and
  means coupled to said first and second register means for receiving one of said encoded data and control parameters, and for providing an output thereof.

14. Apparatus for unpacking data from a packed DS1 trunk into data for a plurality of DS1 trunks, comprising:
  a shift register for receiving a serial input from said packed DS1 trunk, said serial input including data and control parameters;
  a data register coupled to said shift register for receiving said DS1 data;
  a control register coupled to said shift register for receiving said control parameters;
  a buffer coupled to said data register for receiving DS1 data from said data register and storing thereof; and
  a control memory coupled to said control register for receiving control parameters from said control register and storing thereof.

15. The apparatus, as set forth in claim 14, wherein said data register receives samples of said DS1 data for each channel in said DS1 trunks, said buffer receiving and storing said data for each channel, said data sample for each channel having a variable number of bits.

16. The apparatus, as set forth in claim 15, further comprising a finite state machine coupled to said buffer, control memory, data register and control register for generating a plurality of control signals for enabling access thereof, said finite state machine receiving a clock signal and a synchronization signal for demarcating the data samples for each channel.

17. The apparatus, as set forth in claim 15, wherein said apparatus resides in a data compression system and said control parameters include the number of data bits per sample for each channel.

18. Apparatus for unpacking data in a packed DS1 trunk having n channels into four DS1 trunks having 4n channels, comprising:
  a finite state machine for receiving a clock signal and a synchronization signal and producing a plurality of control signals;
  a shift register for receiving a n-channel serial DS1 data, said shift register clocked by said clock signal;
  a data register coupled to said shift register for receiving and storing said DS1 data associated with a channel, said data register clocked by a first control signal produced by said finite state machine;
  a control register coupled to said shift register for receiving and storing control parameters, said control register clocked by a second control signal produced by said finite state machine;
  a buffer coupled to said data register for receiving and storing said DS1 data, said buffer enabled by a third control signal produced by said finite state machine; and
  a control memory coupled to said control register for receiving and storing said channel parameters, said control memory enabled by a fourth control signal produced by said finite state machine.

19. The apparatus, as set forth in claim 18, wherein said data register receives samples of said DS1 data for each channel in said DS1 trunks, said buffer receiving and storing said data for each channel, said data sample for each channel having a variable number of bits.

20. The apparatus, as set forth in claim 19, wherein said clock and said synchronization signals demarcate the data samples for each channel.

21. The apparatus, as set forth in claim 19, wherein said apparatus resides in a data compression system and said control parameters include the number of data bits per sample for each channel.

22. DS1 trunk data unpacking apparatus in a data compression system, said data compression system encodes data for a plurality of channels in a plurality of DS1 trunks, said apparatus comprising:
  input means for receiving encoded data and control parameters;
  first register means coupled to said input means for receiving said encoded data, said encoded data being grouped for each channel;
  buffering means coupled to said first register means for receiving and storing encoded data for each channel;
  first control means enabling access of said first register means by said buffering means to read encoded data for each channel;
  second register means coupled to said input means for reading said control parameters;
  memory means coupled to said second register means for receiving and storing control parameters associated with said data compression; and
  second control means enabling access of said second register means by said memory means.

* * * * *

UNITED STATES PATENT AND TRADEMARK OFFICE
CERTIFICATE OF CORRECTION

PATENT NO. : 5,151,901
DATED : September 29, 1992
INVENTOR(S) : Kishan Shenoi et al.

It is certified that error appears in the above-identified patent and that said Letters Patent is hereby corrected as shown below:

Col. 1, line 25, after "techniques", delete "." and insert --,--

Column 1, line 36, after "techniques", delete "." and insert -- , --.

Column 2, line 28, after "system", delete ":" and insert -- ; --.

Column 9, line 29, delete "B(k-1)=B(k)+N," and insert therefor -- B(k+1)=B(k)+N --.

Column 10, line 58, after "example", insert -- . --.

Claim 3, Column 11, line 47, after "said", delete "infinite" and insert -- finite --.

Claim 6, Column 12, line 8, after "said", delete "infinite" and insert -- finite --.

Claim 11, Column 12, line 64, after "said", delete "infinite" and insert -- finite --.

Signed and Sealed this

Eighteenth Day of January, 1994

Attest:

BRUCE LEHMAN

Attesting Officer     Commissioner of Patents and Trademarks